(12) United States Patent
Konopnicki et al.

(10) Patent No.: US 10,176,258 B2
(45) Date of Patent: Jan. 8, 2019

(54) HIERARCHICAL SEEDLISTS FOR APPLICATION DATA

(75) Inventors: David Konopnicki, Haifa (IL); Laurent D. Hasson, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 11/770,410

(22) Filed: Jun. 28, 2007

(65) Prior Publication Data

US 2009/0006362 A1 Jan. 1, 2009

(51) Int. Cl.
*G06F 17/30* (2006.01)

(52) U.S. Cl.
CPC .... *G06F 17/30864* (2013.01); *G06F 17/3061* (2013.01); *G06F 17/3089* (2013.01); *G06F 17/30613* (2013.01); *G06F 17/30705* (2013.01); *G06F 17/30887* (2013.01)

(58) Field of Classification Search
CPC ........... G06F 17/30864; G06F 17/3089; G06F 17/30887; G06F 17/3061; G06F 17/30705; G06F 17/30613
See application file for complete search history.

(56) References Cited

U.S. PATENT DOCUMENTS

| | | | |
|---|---|---|---|
| 6,014,688 A | 1/2000 | Venkatraman et al. | |
| 6,304,897 B1 | 10/2001 | Venkatraman et al. | |
| 6,631,496 B1 * | 10/2003 | Li | G06F 17/30884 707/999.01 |
| 6,983,236 B1 * | 1/2006 | Karlovac et al. | 703/22 |
| 7,080,073 B1 * | 7/2006 | Jiang et al. | |
| 7,139,747 B1 * | 11/2006 | Najork | G06F 17/30864 |
| 7,293,012 B1 * | 11/2007 | Solaro | G06F 17/30864 |
| 7,970,791 B2 * | 6/2011 | Liao | G06F 21/6227 707/791 |
| 8,386,728 B1 * | 2/2013 | Ionescu | G06F 17/30861 711/158 |
| 2002/0078014 A1 * | 6/2002 | Pallmann | 707/1 |
| 2002/0091684 A1 * | 7/2002 | Nomiyama | G06F 17/3089 |

(Continued)

FOREIGN PATENT DOCUMENTS

WO    WO 2006/058075 A2 * 6/2006 ............. G06F 15/76

OTHER PUBLICATIONS

Hess, Adam, et al; Content-Triggered Trust Negotiation; ACM, vol. 7, No. 3, Aug. 2004, pp. 428-456.

*Primary Examiner* — Srirama Channavajjala
(74) *Attorney, Agent, or Firm* — Steven M. Greenberg, Esq.; Shutts & Bowen LLP

(57) ABSTRACT

Embodiments of the present invention address deficiencies of the art in respect to crawling content and provide a novel and non-obvious method, system and computer program product for seed lists for hierarchically structured content sources. In one embodiment, a method for crawling seed lists for hierarchically structured content sources can be provided. The method can include specifying a depth of crawling for hierarchically structured content, crawling only seed lists at the specified depth among other seed lists in a hierarchy of seed lists mimicking the hierarchically structured content, and returning indexed data for the crawled seed lists. Optionally, an administrator user interface can be provided for specifying the depth of crawling for the hierarchically structured content.

10 Claims, 2 Drawing Sheets

(56) References Cited

U.S. PATENT DOCUMENTS

| | | | |
|---|---|---|---|
| 2002/0099700 A1* | 7/2002 | Li | 707/5 |
| 2002/0129062 A1* | 9/2002 | Luparello | 707/513 |
| 2002/0138509 A1* | 9/2002 | Burrows | G06F 17/3061 715/205 |
| 2004/0128285 A1* | 7/2004 | Green | G06F 17/30864 |
| 2005/0049987 A1* | 3/2005 | Meek et al. | 706/46 |
| 2005/0086206 A1* | 4/2005 | Balasubramanian et al. | 707/3 |
| 2006/0235858 A1* | 10/2006 | Joshi et al. | 707/100 |
| 2007/0143263 A1* | 6/2007 | Agrawal | G06F 17/30864 |
| 2007/0208703 A1* | 9/2007 | Shi et al. | 707/3 |
| 2007/0250486 A1* | 10/2007 | Liao | G06F 21/6227 |
| 2008/0040389 A1* | 2/2008 | Seth et al. | 707/104.1 |
| 2008/0228675 A1* | 9/2008 | Duffy et al. | 706/10 |
| 2009/0006362 A1* | 1/2009 | Konopnicki | G06F 17/30864 |
| 2009/0006364 A1* | 1/2009 | Konopnicki | G06F 17/30864 |
| 2012/0143844 A1* | 6/2012 | Wang | G06F 17/30864 707/709 |

* cited by examiner

HIERARCHICAL SEEDLISTS FOR APPLICATION DATA

BACKGROUND OF THE INVENTION

Field of the Invention

The present invention relates to the field of content crawling and more particularly to crawling hierarchically structured content sources.

Description of the Related Art

The development of the modern computer communications network and the wide-scale adoption of the global Internet as a primary source of information have transformed the way in which information is both generated and also shared amongst individuals. Prior to electronic methods of publishing content, individuals seeking information largely relied upon libraries and personal subscriptions to periodicals, newspapers and journals. By comparison, today one can access vast repositories of data in a matter of minutes that otherwise would consume hours if not days of tedious, manual scouring of print documents.

Even before the popularization of the World Wide Web, information technologists recognized the need to properly index electronic content such that the content can be accessed electronically and remotely by interested parties. Indeed, the very need to access related content led to the development of the hyperlink and markup language formatted documents both of which enabled the acceptance of the World Wide Web. The World Wide Web itself can be viewed as a vast hierarchy of related documents and content, connected through hyperlink relationships all of which can be accessed globally over the Internet. From the very beginning, search engine technologies evolved to address the need to discover and catalog content published and accessible through the World Wide Web.

Search engines generally locate and index content on the World Wide Web and also internally defined networks by parsing content word by word to generate index records correlating the word with a location in a document. In order to automate the discover of available content on the World Wide Web, Internet bots specifically tailored to populate search engine databases commonly are deployed and permitted to "crawl" or "spider" the accessible World Wide Web first locating content, subsequently indexing located content, linking to related content, and repeating the process. Known as crawling or spidering, the foregoing process forms the foundation of modern search engine technologies.

Unlike a general, content crawler, a focused crawler seeks, acquires, indexes, and maintains pages on a specific set of topics that represent a relatively small portion of the World Wide Web. Focused crawlers require a much smaller investment in computing resources and can achieve high coverage of pertinent content at a rapid rate. A focused crawler usually can begin with a seed list that contains uniform resource locators (URLs) that are relevant to a topic of interest. Subsequently, the focused crawler can crawl the URLs and follow the hyperlinks from the pages corresponding to the URLs to identify the most promising hyper links based upon both the content of the source pages and the hyperlink structure of the World Wide Web.

The seed list, then, can resemble a site map of relevant content for a topic of interest. In this regard, site maps directly map to a Web site's entry points. In contrast, a seed list seeks to directly represent content at the application level which differs from the organization of the content at the Web site level. To do this effectively, seed lists mirror application structure and present a hierarchical representation of content as the application originally intended it to be, and not necessarily as a Web site would present the content. Moreover, in a conventional seed list, one must choose either to crawl the entire seed list, or to omit consideration of the seed list. Accordingly, the use of a seed list with a focused crawler does not comport with the hierarchical nature of application data.

BRIEF SUMMARY OF THE INVENTION

Embodiments of the present invention address deficiencies of the art in respect to crawling content and provide a novel and non-obvious method, system and computer program product for seed lists for hierarchically structured content sources. In one embodiment, a method for crawling seed lists for hierarchically structured content sources can be provided. The method can include specifying a depth of crawling for hierarchically structured content, crawling only seed lists at the specified depth among other seed lists in a hierarchy of seed lists mimicking the hierarchically structured content, and returning indexed data for the crawled seed lists. Optionally, an administrator user interface can be provided for specifying the depth of crawling for the hierarchically structured content.

In another embodiment of the invention, a content distribution data processing system can be provided. The system can include hierarchically structured content, a hierarchy of seed lists mimicking the hierarchically structured content, a seed list crawler, and hierarchical seed list browsing logic. The logic can include program code enabled to specify a depth of crawling for the hierarchically structured content, to crawl only seed lists at the specified depth among other seed lists in the hierarchy of seed lists, and to return indexed data for the crawled seed lists. Optionally, an administrator user interface can be configured to specify the depth of crawling.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for crawling seed lists for hierarchically structured content sources. In accordance with an embodiment of the present invention, a seed list for a hierarchically structured content source can be extended to reference other seed lists to mimic the hierarchy of the hierarchically structured content source. Referenced seed lists optionally can reference yet other seed lists and so forth in establishing a hierarchy of seed lists. Thereafter, a crawler can crawl any portion of the extended seed list at any depth of the hierarchy by selectively initiating crawling content at any hierarchical level of seed lists defined for the extended seed list. Thus, content can be crawled and indexed at any depth of the hierarchy reflected by the extended seed list.

Figure 1:
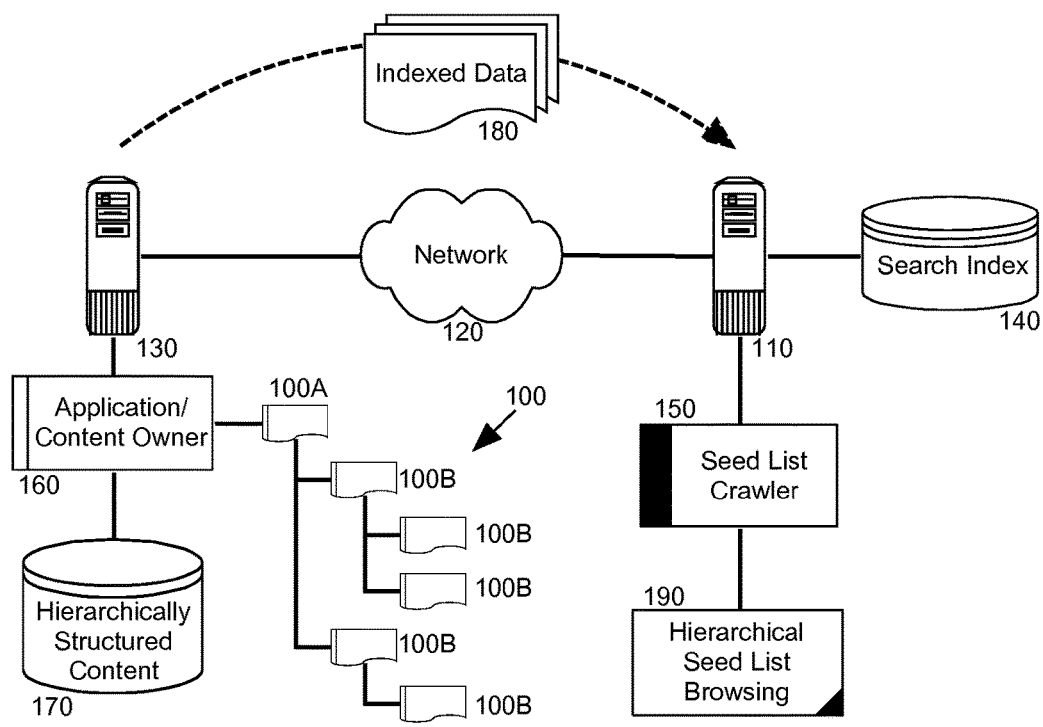
FIG. 1 is a schematic illustration of a content distribution data processing system configured for seed lists for hierarchically structured content sources; and, FIG. 2 is a flow chart illustrating a process for crawling seed lists for hierarchically structured content sources.

In illustration, FIG. 1 schematically depicts a content distribution data processing system configured for seed lists for hierarchically structured content sources. The system can include a host computing platform 130 supporting the operation of an application 160 managing hierarchically structured content 170. The host computing platform 130 can be communicatively coupled to a computer communications network 120, for example the global Internet. The system also can include a seed list crawler 150 operating in a host computing platform 110 also communicatively coupled to the computer communications network 120. The seed list crawler 150 can be configured to crawl the hierarchically structured content 170 by reference to a corresponding seed list 100A and by creating a search index 140 for crawled content referenced in the seed list 100A.

Notably, the seed list 100A can be extended to reference other seed lists 100B in addition to content. In this regard, the hierarchy 100 formed by the seed list 100A and its referenced seed lists 100B can mimic the hierarchically structured content 170 of the application 160. In illustration, a representative form of the seed list 100A can include:

```
<?xml version="1.0" encoding="utf-8"?>
<feed xmlns="http://www.w3.org/2005/Atom">
<title>Feed representing SubSeedlists</title>
<link href="http://example.org/"/>
<updated>2003-12-13T18:30:02Z</updated>
<author> <name>John Doe</name> </author>
<id>urn:uuid:60a76c80-d399-11d9-b93C-0003939e0af6</id>
<entry>
<title>SubSeedlistWithNoEntries</title>
<link href="http://example.org/2003/12/13/atom03" rel="child"/>
<id>urn:uuid:1225c695-cfb8-4ebb-aaaa-80da344efa6a</id>
<updated>2003-12-13T18:30:02Z</updated>
<summary>Subseedlist with no content</summary>
</entry>
<entry>
<title>SubSeedlistWithEntries</title>
<link href=http://example.org/2003/12/13/atom03 " rel="child" />
<id>urn:uuid:1225c695-cfb8-4ebb-aaaa-80da344efa6a</id>
<updated>2003-12-13T18:30:02Z</updated>
<content type="text" xml:lang="en" src="
http://example.org/AtomFeedContainingEntries.xml"
</content>
<summary> Subseedlist that has contents.</summary>
</entry>
</feed>
```

As an alternative, a representative form of a seed list 100A can reference content as follows:

```
<?xml version="1.0" encoding="utf-8"?>
<feed xmlns="http://www.w3.org/2005/Atom">
<title>Seedlist which can return content</title>
<link href="http://example.org/"/>
<updated>2003-12-13T18:30:02Z</updated>
<author> <name>John Doe</name> </author>
<id>urn:uuid:60a76c80-d399-11d9-b93C-0003939e0af6</id>
<entry>
<title>Document1</title>
<link href="http://example.org/Document1.html" rel="via"/>
<id>urn:uuid:1225c695-cfb8-4ebb-aaaa-80da344efa6a</id>
<content type="text" xml:lang="en" src="
http://example.org/Document1.html"
<updated>2003-12-13T18:30:02Z</updated>
<summary>Document 1 summary.</summary>
</entry>
<entry>
<title>Document2</title>
<link href="" rel="via"/>
<id>urn:uuid:1225c695-cfb8-4ebb-aaaa-80da344efa6a</id>
<content type="text" xml:lang="en" src="
http://example.org/Document2.html"
<updated>2003-12-13T18:30:02Z</updated>
<summary>Document 2 summary.</summary>
</entry>
```

As shown in FIG. 1, hierarchical seed list browsing logic 190 can be coupled to the seed list crawler 150. The hierarchical seed list browsing logic 190 can include program code enabled selectively crawl and index the hierarchically structured content by reference to the seed list 100A and its referenced seed lists 100B. In particular, indexed data 180 can be retrieved by the logic 190 for selected portions of the hierarchically structured content 170 by processing only selected ones of the seed lists 100B.

For example, the logic 190 can specify to only collect indexed data 180 for content at or below a particular depth of the hierarchy 100 by processing content and corresponding seed lists 100B at or below the specified depth. Likewise, the logic 190 can specify to only collect indexed data 180 for content at a particular depth of the hierarchy 100 by processing content and corresponding seed lists 100B at the specified depth. Yet further, the logic 190 can specify to collect indexed data 180 for content at all depths of the hierarchy 100 by processing content and corresponding seed lists 100A, 100B at all depths of the hierarchy 100. Crawling directives for collecting indexed data 180 can be specified through an administration user interface presenting the hierarchy 100 of seed lists 100A, 100B.

Figure 2:
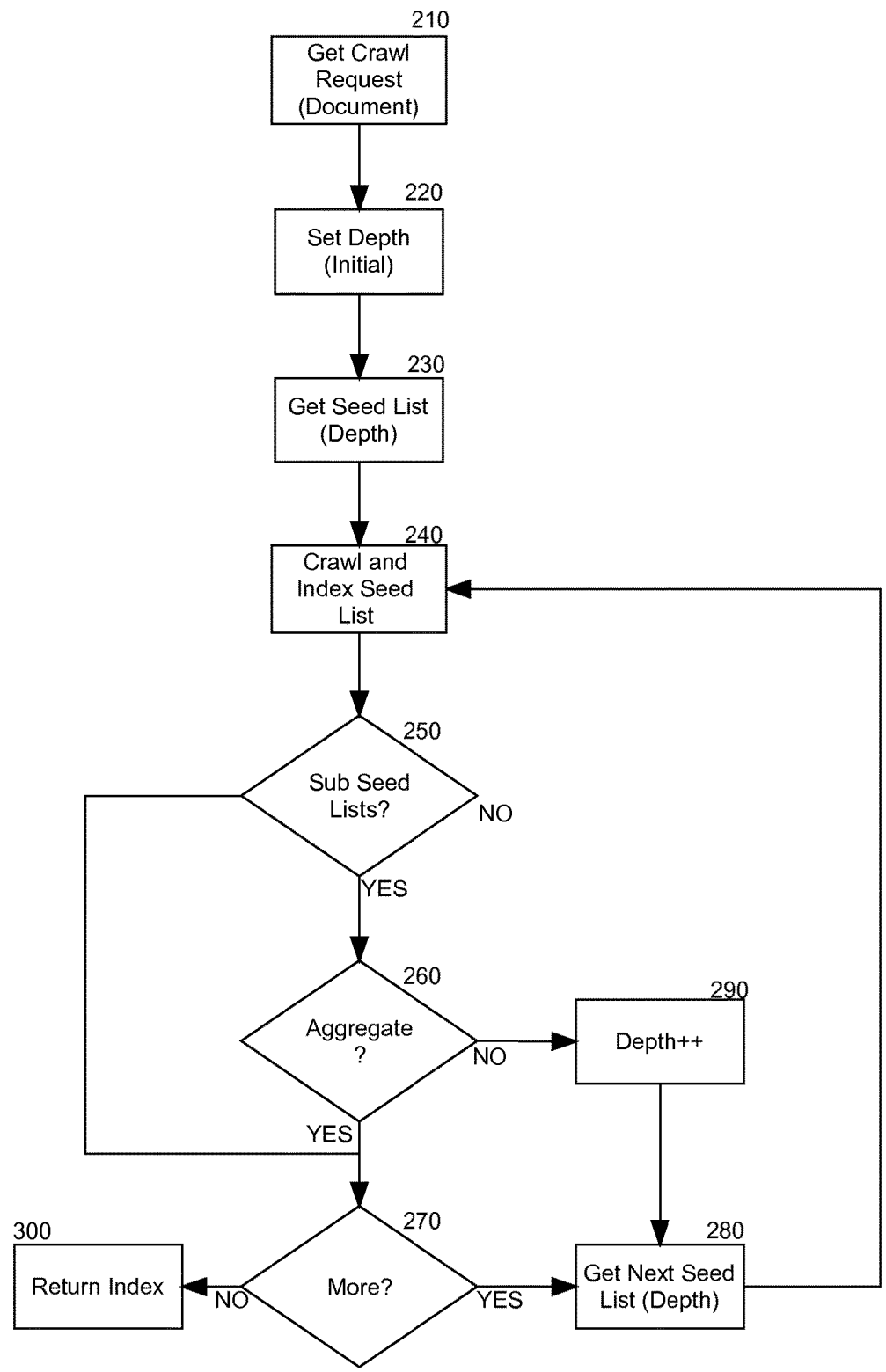

In further illustration, FIG. 2 is a flow chart illustrating a process for crawling seed lists for hierarchically structured content sources. The process can begin in block 210 in which a crawl request can be received. In block 220, an initial depth of crawling can be established for the hierarchy of seed lists and in block 230, a seed list can be retrieved from within the hierarchy of seed lists. In particular, to the extent that the initial depth of the hierarchy is set to root, the entire hierarchy of seed lists can be crawled. In any event, in block 240, a seed list at the specified depth can be selected, crawled and its content indexed according to the seed list. Thereafter, in decision block 250 it can be determined if sub-seed lists appear within the selected seed list. If so, in decision block 260 it further can be determined whether the sub-seed lists of the selected speed list are to be aggregated, or whether the sub-seed lists are to be processed separately.

In decision block 260, if it is determined that the sub-seed lists are to be processed separately, in block 290 the selected depth can be increased to account for the sub-speed lits and the process can continue through block 280 with the selection of the speed lists at the specified depth and with the crawling and indexing of the sub-speed lists in block 240. Where no sub-speed lists are present in the selected speed list, or where the sub-speed lists for the selected speed list are to be aggregated, in decision block 270 it can be determined if additional speed lists remain to be processed. If so, the process can continue in block 280 with the selection of a next speed list at the specified depth. When no speed lists remain to be processed, in block 300 the index can be returned to the requestor.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for crawling seed lists for hierarchically structured content sources, the method comprising:

specifying in a seed list crawler executing in a host computing platform comprising a processor and memory and communicatively coupled to a computer communications network, a depth of crawling for hierarchically structured content;

selecting by the crawler a hierarchy of a multiplicity of seed lists each defined in markup language, each of the seed lists in the hierarchy comprising a multiplicity of different uniform resource locators each pointing to a different portion of a Web site, the seed lists mimicking the hierarchically structured content by extending selected ones of the seed lists, each extended seed list referencing at least one other of the seed lists so as to form the hierarchy to be comparable in form to a hierarchical structure of nodes of the hierarchically structured content and also selecting by the crawler one or more of the seed lists to be processed separately and also one or more seed lists to be aggregated;

crawling and indexing by the seed list crawler operating only ones of the seed lists among other seed lists in the hierarchy of seed lists at the specified depth of the hierarchically structured content and below the specified depth of the hierarchically structured content while omitting from aggregation any seed list above the specified depth of the hierarchically structured content and any seed list selected to be processed separately, by beginning crawling of each of the ones of the seed lists at the specified depth and for each of the seed lists encountered below the specified depth that are determined to have been selected for aggregation and not to be processed separately, aggregating the encountered seed lists until reaching an end of the hierarchically structured content; and, returning indexed data for all of the aggregated seed lists.

2. The method of claim 1, wherein crawling only seed lists at the specified depth among other seed lists in a hierarchy of seed lists mimicking the hierarchically structured content, comprises crawling only seed lists at and below the specified depth among other seed lists in a hierarchy of seed lists mimicking the hierarchically structured content.

3. The method of claim 1, further comprising generating the hierarchy of seed lists, each seed list corresponding to a node of content in the hierarchically structured content.

4. The method of claim 1, further comprising providing an administrator user interface for specifying the depth of crawling for the hierarchically structured content.

5. A content distribution data processing system comprising:

a host computing platform comprising a processor and memory and communicatively coupled to a computer communications network;

hierarchically structured content;

a hierarchy of multiplicity of seed lists each defined in markup language, each of the seed lists in the hierarchy comprising a multiplicity of different uniform resource locators each pointing to a different portion of a Web site, the seed lists mimicking the hierarchically structured content, the seed lists mimicking the hierarchically structured content by extending selected ones of the seed lists, each extended seed list referencing at least one other of the seed lists so as to form a hierarchy of seed lists comparable in form to a hierarchical structure of nodes of the hierarchically structured content;

a seed list crawler operating in the host computing platform, the crawler selecting one or more of the seed lists to be processed separately and also one or more seed lists to be aggregated; and, hierarchical seed list browsing logic comprising program code enabled when executing in the memory by the processor to specify a depth of crawling for the hierarchically structured content, to crawl and index only ones of the seed lists among other seed lists in the hierarchy of seed lists at the specified depth of the hierarchically structured content and below the specified depth of the hierarchically structured content while omitting from aggregation any seed list above the specified depth of the hierarchically structured content and any seed list selected to be processed separately, by beginning crawling of each of the ones of the seed lists at the specified depth and for each of the seed lists encountered below the specified depth that are determined to have been selected for aggregation and not to be processed separately, aggregating the encountered seed lists until reaching an end of the hierarchically structured content, and to return indexed data for all of the aggregated seed lists.

6. The system of claim 5, further comprising an administrator user interface configured to specify the depth of crawling.

7. A computer program product comprising a computer usable storage medium comprising a memory device embodying computer usable program code for crawling seed lists for hierarchically structured content sources, the computer program product comprising:

computer usable program code for specifying in a seed list crawler executing in a host computing platform comprising a processor and memory and communicatively coupled to a computer communications network, a depth of crawling for hierarchically structured content;

computer usable program code for selecting by the crawler a hierarchy of a multiplicity of seed lists each defined in markup language, each of the seed lists in the hierarchy comprising a multiplicity of different uniform resource locators each pointing to a different portion of a Web site, the seed lists mimicking the hierarchically structured content by extending selected ones of the seed lists, each extended seed list referencing at least one other of the seed lists so as to form the hierarchy to be comparable in form to a hierarchical structure of nodes of the hierarchically structured content and also selecting by the crawler one or more of the seed lists to be processed separately and also one or more seed lists to be aggregated;

computer usable program code for crawling and indexing by the seed list crawler only ones of the seed lists among other seed lists in the hierarchy of seed lists at the specified depth of the hierarchically structured content and below the specified depth of the hierarchically structured content while omitting from aggregation any seed list above the specified depth of the hierarchically structured content and any seed list selected to be processed separately, by beginning crawling of each of the ones of the seed lists at the specified depth and for each of the seed lists encountered below the specified depth that are determined to have been selected for aggregation and not to be processed separately, aggregating the encountered seed lists until reaching an end of the hierarchically structured content; and, computer usable program code for returning indexed data for all of the aggregated seed lists.

8. The computer program product of claim 7, wherein the computer usable program code for crawling only seed lists at the specified depth among other seed lists in a hierarchy of seed lists mimicking the hierarchically structured content, comprises computer usable program code for crawling only seed lists at and below the specified depth among other seed lists in a hierarchy of seed lists mimicking the hierarchically structured content.

9. The computer program product of claim 7, further comprising computer usable program code for generating the hierarchy of seed lists, each seed list corresponding to a node of content in the hierarchically structured content.

10. The computer program product of claim 7, further comprising computer usable program code for providing an administrator user interface for specifying the depth of crawling for the hierarchically structured content.

* * * * *